(12) United States Patent
Kesterson et al.

(10) Patent No.: US 7,974,109 B2
(45) Date of Patent: Jul. 5, 2011

(54) DIGITAL COMPENSATION FOR CABLE DROP IN A PRIMARY SIDE CONTROL POWER SUPPLY CONTROLLER

(75) Inventors: John W. Kesterson, San Jose, CA (US); Mark R. Muegge, Cupertino, CA (US); Mark D. Eason, Hollister, CA (US)

(73) Assignee: iWatt Inc., Los Gatos, CA (US)

( * ) Notice: Subject to any disclaimer, the term of this patent is extended or adjusted under 35 U.S.C. 154(b) by 236 days.

(21) Appl. No.: 11/745,300

(22) Filed: May 7, 2007

(65) Prior Publication Data

US 2008/0278132 A1 Nov. 13, 2008

(51) Int. Cl.
*H02M 3/335* (2006.01)
*H02M 3/338* (2006.01)
(52) U.S. Cl. ...................... 363/21.16; 363/97
(58) Field of Classification Search .............. 363/20, 363/21.09, 21.1, 21.11, 21.17, 21.18, 97; 323/283
See application file for complete search history.

(56) References Cited

U.S. PATENT DOCUMENTS

| | | | | |
|---|---|---|---|---|
| 5,978,235 A | * | 11/1999 | Lampinen | 363/21.16 |
| 6,841,984 B2 | * | 1/2005 | Hernandez | 323/324 |
| 6,972,969 B1 | * | 12/2005 | Shteynberg et al. | 363/21.12 |
| 7,099,163 B1 | * | 8/2006 | Ying | 363/21.11 |
| 7,247,955 B2 | * | 7/2007 | Tracy et al. | 307/151 |
| 7,869,229 B2 | | 1/2011 | Huynh et al. | |
| 2007/0133234 A1 | * | 6/2007 | Huynh et al. | 363/20 |

* cited by examiner

*Primary Examiner* — Gary L. Laxton
*Assistant Examiner* — Nusrat J Quddus
(74) *Attorney, Agent, or Firm* — Fenwick & West LLP (57) ABSTRACT

A system and a method that uses primary side sensing to regulate the output voltage at a cable end without any remote sensing of cable connections back from the load. This is accomplished by approximating the current from the control voltage in the control loop through the relationship that defines the Ton time in terms of the control voltage Vc. Once the approximation of the output current is known, it is multiplied by a known fixed cable resistance, and this value is subtracted from the feedback sensor output before it is subtracted from the digital reference. This forces the regulator to raise the output voltage by the amount of drop across the cable, causing the output of the cable to be maintained at the targeted regulation point.

15 Claims, 8 Drawing Sheets

Figure 4
Approximate Linear Relationship between
Loop Control Voltage and Output Current

System without cable drop compensation at output of delivery cable

System without cable drop compensation at output of delivery cable

Figure 7
Output VI curves – no cable comp

System with cable drop compensation at output fo supply.

System with cable drop compensation at output of delivery cable

Figure 8
Output VI curves -with cable comp

DIGITAL COMPENSATION FOR CABLE DROP IN A PRIMARY SIDE CONTROL POWER SUPPLY CONTROLLER

FIELD OF THE INVENTION

The present invention is related to a power supply and more particularly to pulse width modulation (PWM) and pulse frequency modulation (PFM) controllers for regulation of voltage and/or current with primary-side sensing and feedback.

BACKGROUND OF THE INVENTION

Pulse width modulation (PWM) is a conventional technology used for controlling power converters to achieve output power, voltage, and current regulation. Conventional flyback power converters include a power stage for delivering electrical power from a power source to a load, a switch in the power stage that electrically couples or decouples the load to the power source, and a switch controller coupled to the switch for controlling the on-time and off time for the switch. The on-time ($T_{ON}$) and off-time ($T_{OFF}$) for the switch can be modified by the controller based on a feedback signal representing output power, voltage, or current. The energy is stored in the transformer core gap when the switch is on, and is transferred to the load circuit when the switch is off. Regulation can be accomplished by, among other things, measuring the output power, voltage, or current, and feeding an indicating signal back to the primary side controller, which can modify the $T_{ON}$-time and $T_{OFF}$-time of the switch accordingly to effectively regulate the output power, voltage, or current. The switching cycle $T_S$ is the sum of the on-time $T_{ON}$ and off-time $T_{OFF}$.

In power supply designs, it is necessary to regulate power, voltage, or current depending upon the application. It is also desirable to regulate the output voltage at the end of a cable attached to the power supply, rather than to merely regulate the voltage at the output of the supply. The present invention is related to the regulation of voltage and current at the end of the cable attached to the supply where the resistance of that cable is a known value when the controller is a primary side controller.

Figure 1:
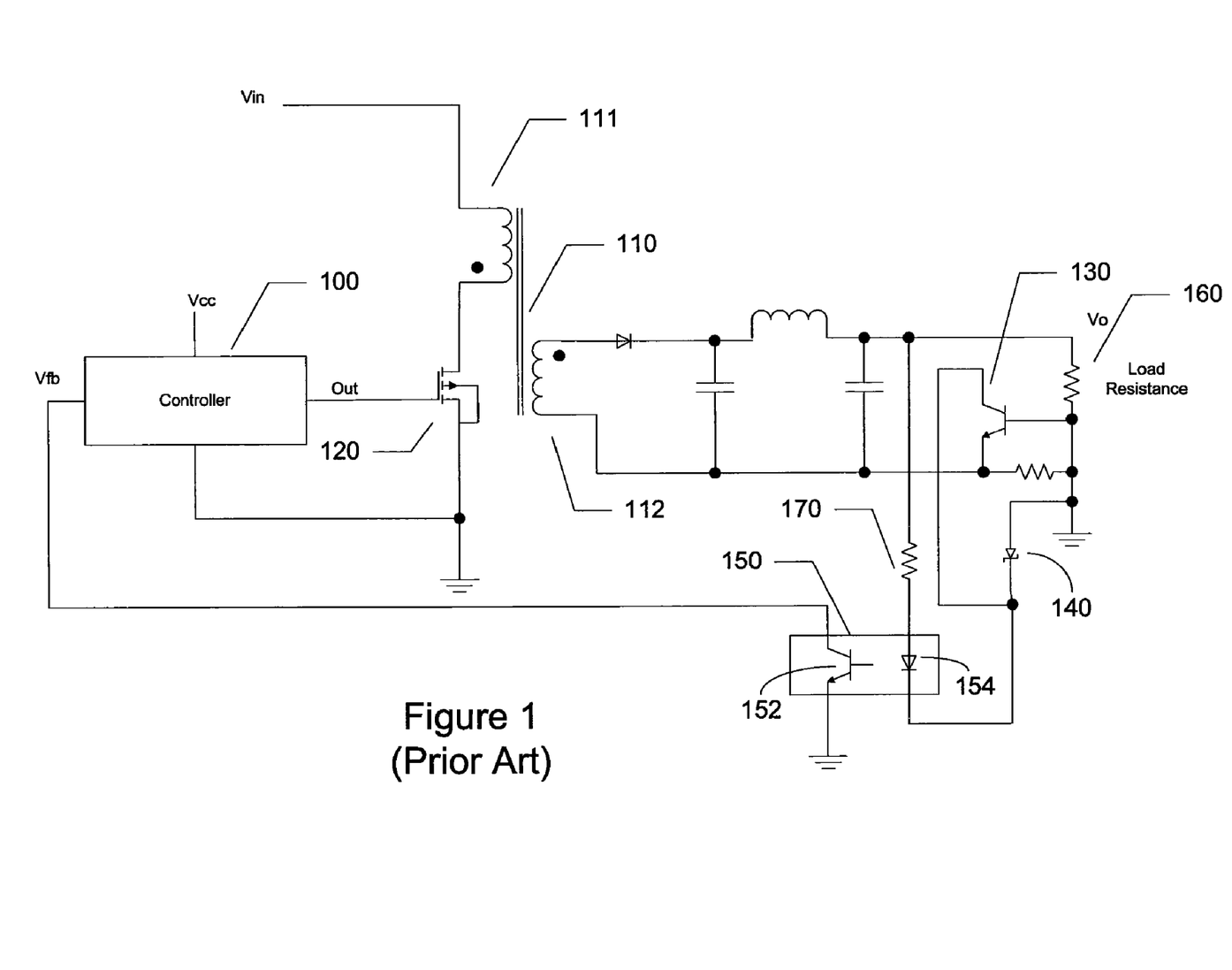
FIG. 1 is an illustration of a conventional secondary side feedback control system for voltage and current regulation.

One conventional power supply system involves a flyback converter that senses the output voltage directly from the secondary side of the transformer. This is called secondary sensing. FIG. 1 is an illustration of such a conventional secondary side sensing circuit.

FIG. 1 illustrates a traditional flyback power supply with secondary sensing. It is configured to regulate both voltage in constant voltage (CV) mode and current in constant current (CC) mode. The PWM controller 100 is powered by Vcc which can be derived a number of different ways from the power supply. When the PWM controller begins operation, it outputs a PWM stream to MOSFET 120, which turns on the primary current of transformer 110. As the flyback operation takes place, energy is transferred from the primary side 111 to the secondary side 112 of the transformer 110 during each cycle that over time constitutes an output power to be dissipated over the Load 160. As the output voltage exceeds the sum of the zener diode 140 voltage and the drop across the forward biased diode 152, which is part of the opto-coupler 150, the opto-coupler diode 152 conducts, and turns on the NPN photo-transistor 154 that is part of the same opto-coupler 150 integrated circuit. When the transistor 154 is turned on, this draws current that causes the controller to reduce the $T_{ON}$-time. In addition, there is a current sense resistor 170 that will develop a voltage drop across the base-emitter junction of transistor 130. When the load resistance 160 is decreased such that the power supply delivers the maximum current, the transistor 130 bypasses the zener diode 140, and causes current regulation.

Figure 2:
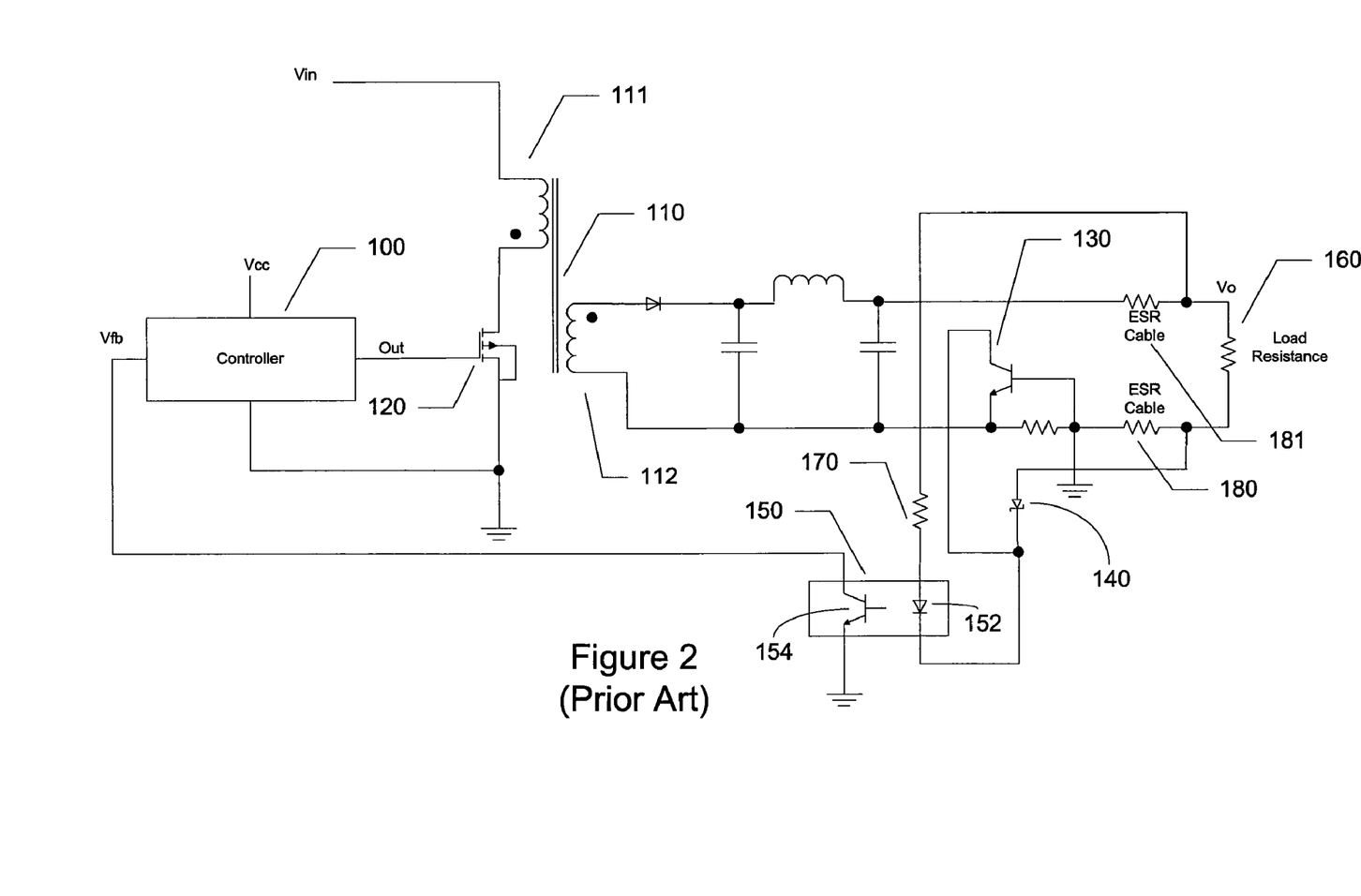
FIG. 2 is an illustration of a conventional secondary side feedback control system for voltage and current regulation with remote sensing added so that the output at the end of the delivery cable will be regulated.

Note in FIG. 1 that the voltage sense resistor 170 is connected to the output of the secondary of the supply. If there is a resistive cable between the output and the resistive load, the point of regulation can be moved to the load side of the cable to accomplish regulation at the destination side of the cable. This is shown in FIG. 2. The resistive load 160 is now separated from the supply by the equivalent series resistances of each half of the delivery cable 280 and 281. To cause the regulation to compensate for the resistance of the cable, the points of regulation are moved to the destination end of the cable. This has the very costly problem of having to have 4 wires in the delivery cable, which is a significant cost issue in small applications. This method of regulation is typically known as remote sensing.

There are at least two significant drawbacks in cost to this secondary side regulation solution, even when there is no requirement for "remote sensing", or cable end regulation. First, it requires the external circuit consisting of the transistor 130 and the current sense resistor 170 to aid the current regulation. The second drawback is the wasted power dissipated by the sense resistor, which reduces the overall system efficiency.

Figure 3:
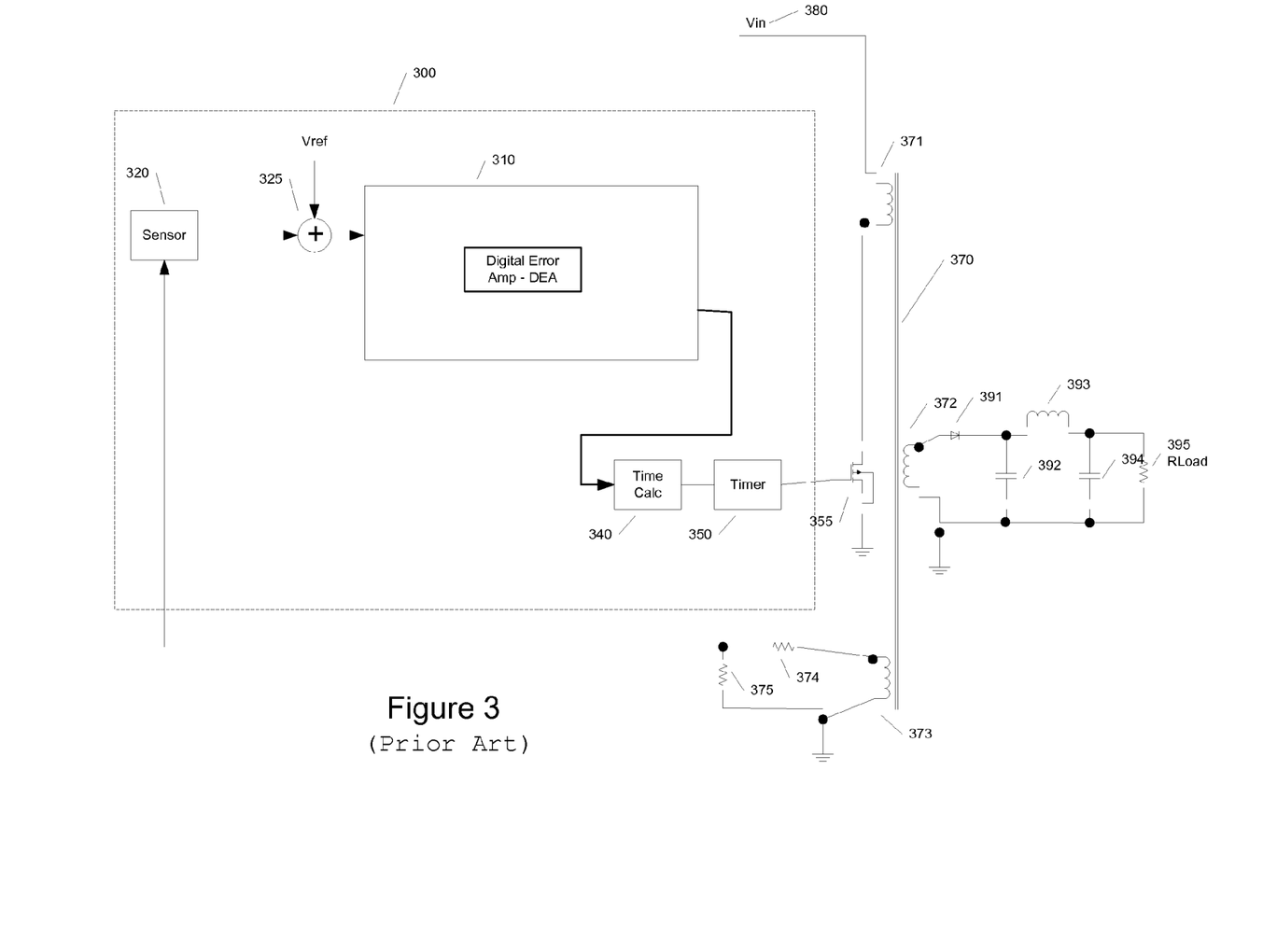
FIG. 3 is an illustration of a control system for voltage and current regulation that does not contain any method for compensation of the output voltage for the voltage drop in a delivery cable.

FIG. 3 is an illustration of a conventional primary side sensing regulation circuit that overcomes some of the problems described above. It accomplishes the same regulation functions, but the feedback for regulation is taken from the transformer on the primary side of its safety isolation barrier.

In FIG. 3, there is a fly-back transformer 370 with primary winding 371 and secondary winding 372. For primary feedback control, there is an additional winding 373 added to the transformer installed on the same side of the safety isolation barrier as the primary winding. When the controller 300 outputs a pulse to the switching MOSFET 355, the current in the primary 371 of the transformer ramps up linearly for the duration of the pulse. When the switch 355 is turned off, the collapsing field is coupled to the output or secondary winding to transfer energy to the secondary.

In a flyback type power converter that operates in discontinuous conduction mode, the output power $P_0$ can be expressed as:

$$P_o = \frac{Vin^2}{2L_M} \times \frac{t_{on}^2}{T_S} \times \eta \qquad (1)$$

Where η is the power efficiency (Po/Pin), and
The output voltage is thus expressed as:

$$Vo = Vin \cdot Ton \sqrt{\frac{R}{2L_M T_S}} \cdot \eta \qquad (2)$$

The operation of the system shown in FIG. 3 is now set forth. The auxiliary winding of the transformer 373 feeds a voltage reflection of the output secondary that is used to track the output voltage. This can be done with various sensors 320 that know how to analyze the voltage waveform from the auxiliary winding 373. One example of a such a sensor 320 (also known as a GAP detector) is described in U.S. Pat. No. 6,956,750 which is incorporated by reference herein in its entirety. The output of that sensor 320 is subtracted by the subtraction unit 325 from a digital reference level (Vref) that corresponds with the ideal regulated output voltage. The output of the subtraction unit 325 is called an error value, and it drives a function called 310 the Digital Error Amplifier (DEA). This is essentially the system loop filter, which can contain various combinations of digital filters to process the error and create a digital Control Voltage (called Vc). In one embodiment of the present invention, the DEA 310 is a Proportional-Integral (PI) filter. This output goes to a time calculator (340) which calculates the on time for the switch 355 in the fly-back power converter. The output of this calculation drives a timer (350) which in turn creates the PWM pulse that drives the switch 355.

The Digital Error Amp 310 contains an integrator (Proportional-Integrator embodiment) such that the output will become steady state when the input error from the subtraction unit 325 is equal to 0. Therefore one can see that the Ton time is varied through the loop control to maintain a voltage that is represented by the Vref input to the error subtraction 325.

What is needed is a modification to the primary side sensing control system that (1) provides a method for compensating the output voltage for the amount of voltage dropped in the delivery cable, and (2) does so without requiring any other sensor feedback other than the already existing auxiliary winding input from the transformer.

SUMMARY OF THE INVENTION

The present invention is a modification to a primary side sensing power control system and method for voltage and current regulation that facilitates regulation of the output at the end of a resistive delivery cable, as compared to regulation at merely the output of the system itself. Conventional systems use "remote sensing" which requires additional wires between the power supply and the load, for insuring that regulation is with respect to the load end of the cable. The "remote sensing" method adds two sense wires that conduct little or no current, so that the voltage drop across them is minimal. This allows the controller to know what the voltage is at the output of the cable. The present invention is a modification to the control system that allows for an approximate increase of the output voltage to compensate for the approximated loss through the cable based on a current sense based on the control voltage of the loop and the knowledge of the cable resistance.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory and/or within a logic element. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining"

or "dividing" or the like, refer to the action and processes of a logic device, collection of logic devices, computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

As described above, the present invention is a modification to a system and method that enables a system that can otherwise regulate the output voltage at the systems output to be able to regulate voltage at the load end of a resistive delivery cable. This delivery cable is typically a few meters in length, and is used to transport power from the supply to an electric load of some type. The present invention accomplishes this by approximating the output current by observing the control voltage from the loop filter. Through a set of scaling operations, it is able to calculate the expected voltage drop through the delivery cable, and compensate the regulation point so that the regulation is maintained at the output of the delivery cable.

In a fly-back power converter that operates in discontinuous conduction mode, the peak primary current is:

$$I_{PP} = \frac{V_{in}}{L_M} T_{on} \qquad (3)$$

This is based on the familiar relationship between voltage and current in an inductor:

$$\frac{d}{dt} IL = V \qquad (4)$$

The output secondary peak current is:

$$I_{PS} = I_{PP} N \qquad (5)$$

Where $I_{PS}$ is the peak secondary current and N is the turns ratio of the transformer. The average output current is:

$$I_{AS} = \frac{I_{PS}}{2} \frac{T_R}{T_S} \qquad (6)$$

The value $T_R$ is the reset time for the secondary of the transformer. That is, the reset time is the duration of the current pulse on the secondary side, e.g., the time for the magnetic field of the secondary winding to collapse Therefore, by substitution, the output average current is defined as:

$$I_{AS} = \frac{V_{in}}{2L} T_{ON} N \frac{T_R}{T_S} \qquad (8)$$

$$I_{AS} = \frac{V_{in} T_{on} N T_R}{2L_M T_S} \qquad (9)$$

There is also the following known relationship.

$$V_{in} T_{on} = V_o T_R N \qquad 10$$

Therefore:

$$T_R = \frac{V_{in} T_{on}}{V_o N} \qquad 11$$

Substituting equation 11 into equation 9, and replacing $I_{AS}$ with $V_o/R$, results in the output voltage as:

$$Vo = Vin \cdot Ton \sqrt{\frac{R}{2L_M T_S}} \qquad 12$$

Although this equation does not consider the impact of efficiency, it does describe a relationship that demonstrates that the output voltage Vo is a linear function of Ton. If R is constant, then the output current Io is also a linear function of Ton. There is a feedback loop that increases and decreases Ton as necessary to maintain a regulated output at some predefined level. If, while regulating the output voltage, the system monitors the Ton that is required to maintain the voltage regulation, then it can use that information to approximate the current that is being delivered to that load. If the output current can be approximated, and since the resistance of the delivery cable is known, then the expected voltage drop through the delivery cable can be determined using ohms law (V=I×R)

Furthermore, if the Ton is a linear function (or close to a linear function) of the loop filter control voltage (Vc), then the Vc can also be used in the same way to approximate the output current. The steps used after that approximation are similar, that is, the current is multiplied by the delivery cable loss, and the regulation point is effectively modified by the expected drop so that the output voltage regulates to the desired level plus that of the loss in the delivery cable, such that the output at the load end of the delivery cable is regulated at the desired voltage.

Figure 5:
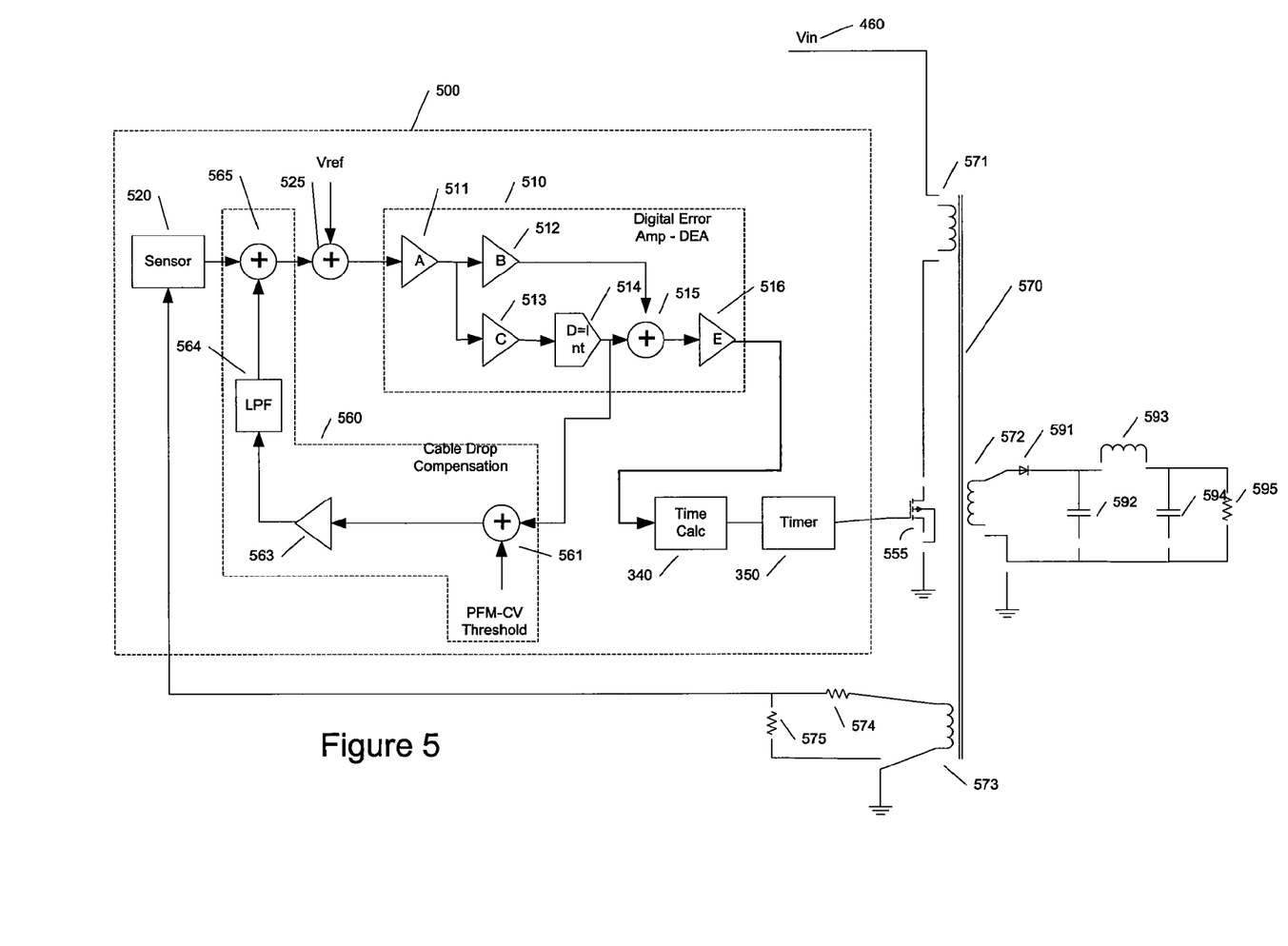
FIG. 5 is an illustration of a primary side sensing feedback control system for voltage and current regulation that compensates for the output voltage for the voltage drop in a delivery cable in accordance with one embodiment of the present invention.

In one embodiment of the present invention, the output of the digital error amplifier 510 which is the loop filter is applied to the Time calculator which executes an equation of the form:

$$T_{on} = \frac{V_c - k_1}{k_2 Vin} k_3 \qquad (13)$$

If k1, k2, and k3 are constants, then Ton is a linear function of Vc since Vc is not a function of Vin. Also, when equation 13 is substituted into equation 12 the output voltage Vo remains linearly sympathetic to the control voltage Vc.

Although Vo is a linear function of Ton, and Ton is a linear function of Vc, Iout is not exactly a linear function of Vc, but it is close enough to where the approximation still yields excellent results.

Substituting Vo/Io=R into equation 12 and substituting the right side of equation 13 for Ton, results in:

$$V_o = V_{in} \frac{V_c - k_1}{k_2 V_{in}} k_3 \sqrt{\frac{\frac{V_o}{I_o}}{2L_m T_s}} \quad (14)$$

Solving this equality for Io as a function of Vc shows an aspect of the function, which is a second order relationship:

$$I_o = k_3^2 \frac{V_c^2 - 2V_c + k_1^2}{2V o k_2^2 L_m T_s}$$

Figure 4:
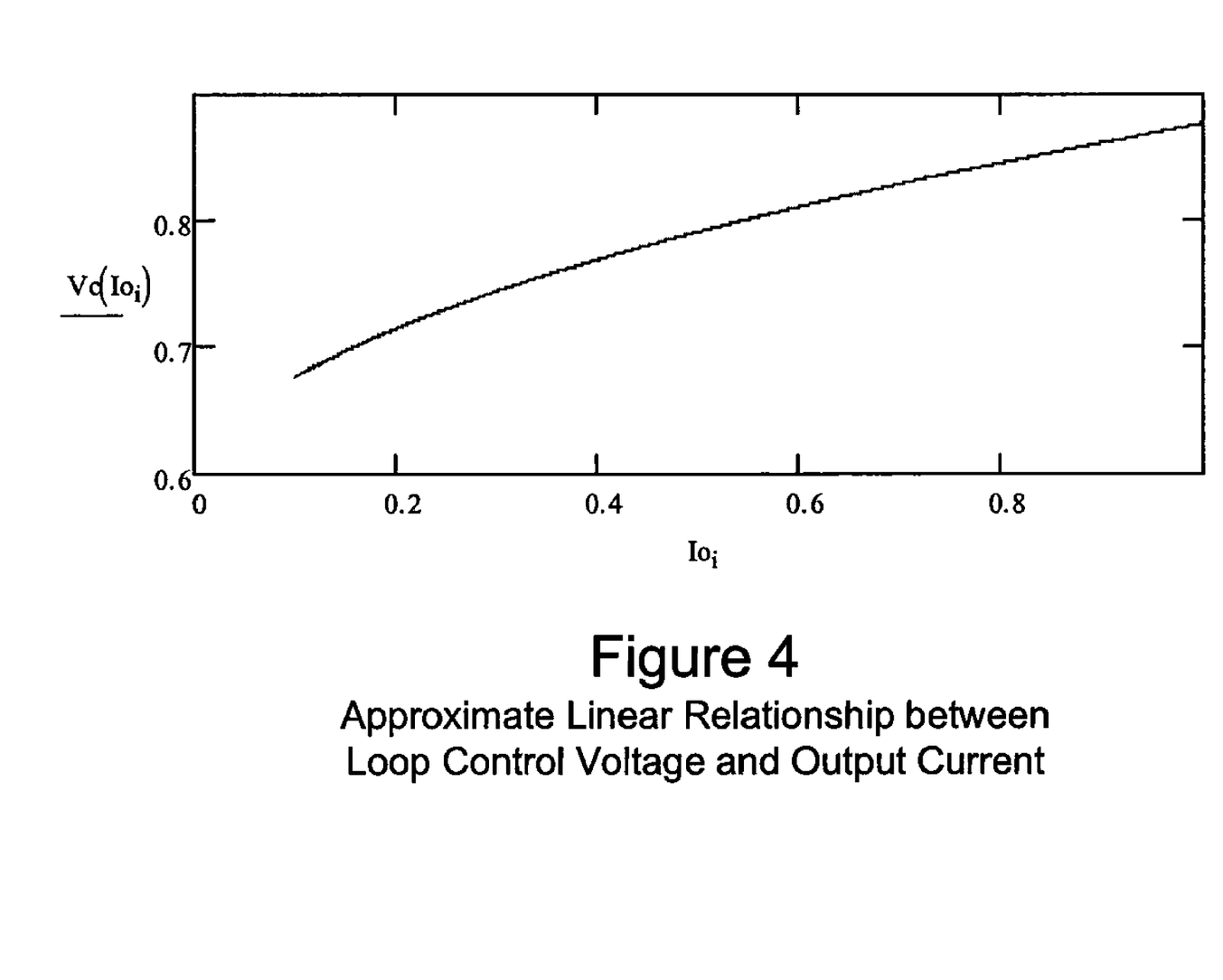
FIG. 4 is an illustration of the near linear relationship that exists between control voltage which is digitally represented in the system, and the average output current of the system in accordance with one embodiment of the present invention.

With realistic values for all the coefficients and parameters, FIG. 4 is a plot of the typical Io vs. Vc curve. From the plot, one can see that the linear approximation will cause significantly less error than the amount being compensated for.

There is an added benefit to using the control voltage, since the control voltage is made up of a proportional term and an integral term. The "I" term component of the control voltage can be used for this purpose since it is less noisy due to the integration. This allows the invention to maintain an average current that is not prone to creating excessive noise on the output.

FIG. 5 is an illustration of one embodiment of the present invention. In FIG. 5, the output of the controller is seen connected to the switch transistor 555 which enables current through the primary of the fly-back transformer 571. When the PWM pulse terminates, the field collapses, passing current from the secondary 572 of the transformer 570 to the output load through the ripple filter consisting of capacitors 592 and 594, and inductor 593. The average output current is thus imposed upon resistor 595, which is an electric load that could consist of a known fixed resistance in the delivery cable.

As the magnetic field collapses, a voltage waveform is developed across the auxiliary winding 573 of the transformer 570 and is passed to the sensor 520 in the controller 500 through a resistive divider consisting of resistors 574 and 575. The sensor 520 develops a digital representation of the reflected output voltage, i.e., Vfb_dig. This signal would normally be subtracted from a digital representation of the desired output voltage at 525. But instead, it is first modified with a digital representation of what the system estimates the delivery cable loss in voltage to be. The development of this estimate is described in further detail below.

The approximated offset voltage digital representation to compensate for the cable drop is first subtracted 565 from the sensor 520 output, and this result is then further subtracted 525 from a digital representation of a reference voltage. The digital result of this operation is an error signal that is used as the input to a Digital Error Amplifier (DEA) 510.

The Digital Error Amplifier (DEA) 510 consists of a digital proportional integral type of loop filter. The proportional path consists of gain block A 511, gain block B 512, adder 515, and gain block E 516. The integral path consists of gain block A 511, gain block C 513, numerical accumulator (integrator) D 514, adder 515, and gain block E 516. The gain blocks are all programmable and are set at different levels during different modes of operation to optimize the response of the system based on the loading conditions. The load conditions are broken into light load, normal constant voltage control mode, and constant current control modes.

One feature of this invention concerns itself with the normal voltage control mode. The first mode, light load, needs no compensation since there is very little current, and therefore very little current drop across the output cable. The last mode, current mode regulation, does not need any correction because at this point, voltage is not being regulated, but current is.

As shown above, the control voltage in the normal constant voltage mode has a relatively linear relationship with the output current when Vout is continuously regulated to a fixed point. Therefore a scaled version of the Integral term of the control voltage is applied to the cable drop compensation 560 module, where a reference number called the PFM-CV threshold is subtracted from it. This compensates for the Y intercept of the linear equation that approximates output current as a function of either loop filter control voltage (Vc) or on-time (Ton). This Y intercept is present because of the k1 term in equation (13). This Y intercept is subtracted in the subtraction component 561 of the cable drop compensation module 560. The result of this subtract operation is proportional to output current.

The result described above is scaled by a factor that turns it into a digital representation of voltage drop across a known output cable resistance. This step uses ohms law to determine the voltage drop and also scales the value using gain unit 563 into the number of least significant bits that represents that voltage drop.

The output of the ohms law determination is filtered by a low pass filter 564 with a relatively low corner frequency, to eliminate instability created in the loop control that would be introduced by this additional path. The filter causes the current sensor to effectively be an average current sensor over a relatively long time constant.

Figure 7:
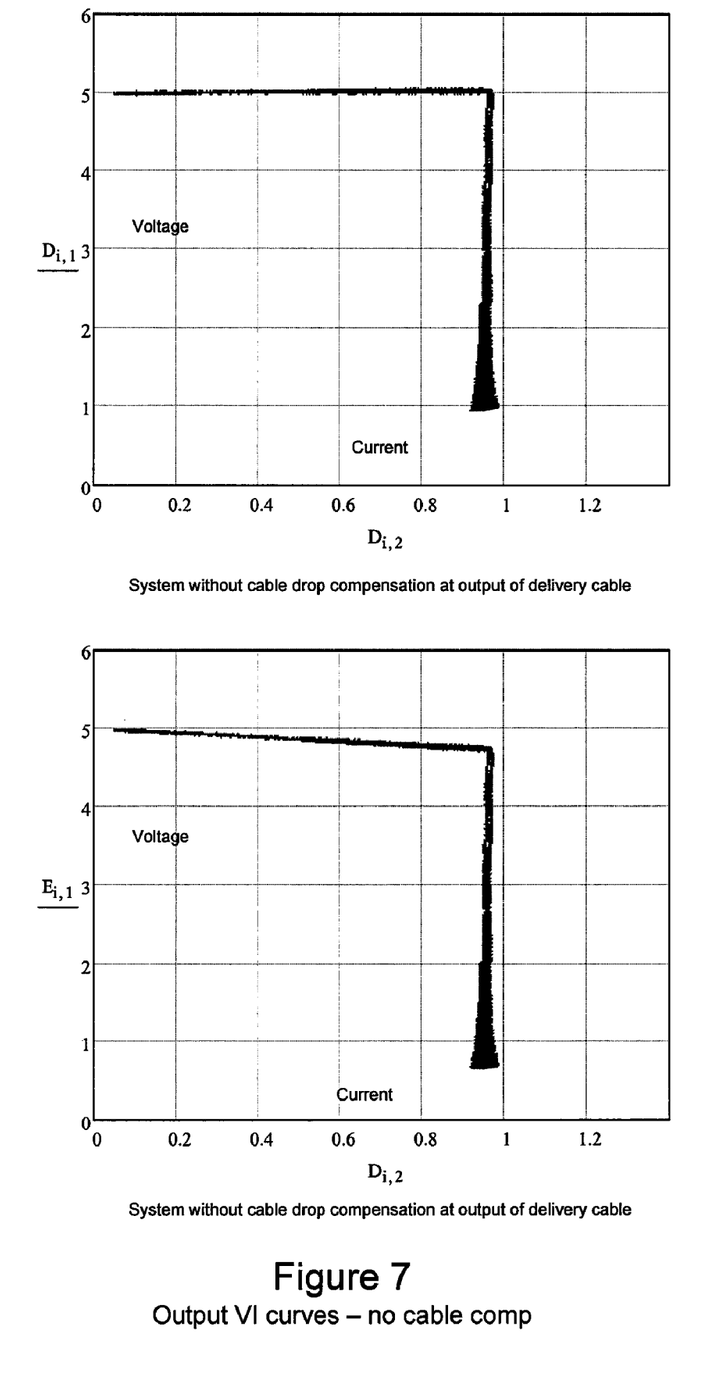
FIG. 7 is a plot of a VI performance curve showing the output voltage and current performance at the output of a power supply, and at the end of a 300 mili-ohm cable used as a delivery cable. This plot is for a system without the modification of the present invention.
Figure 8:
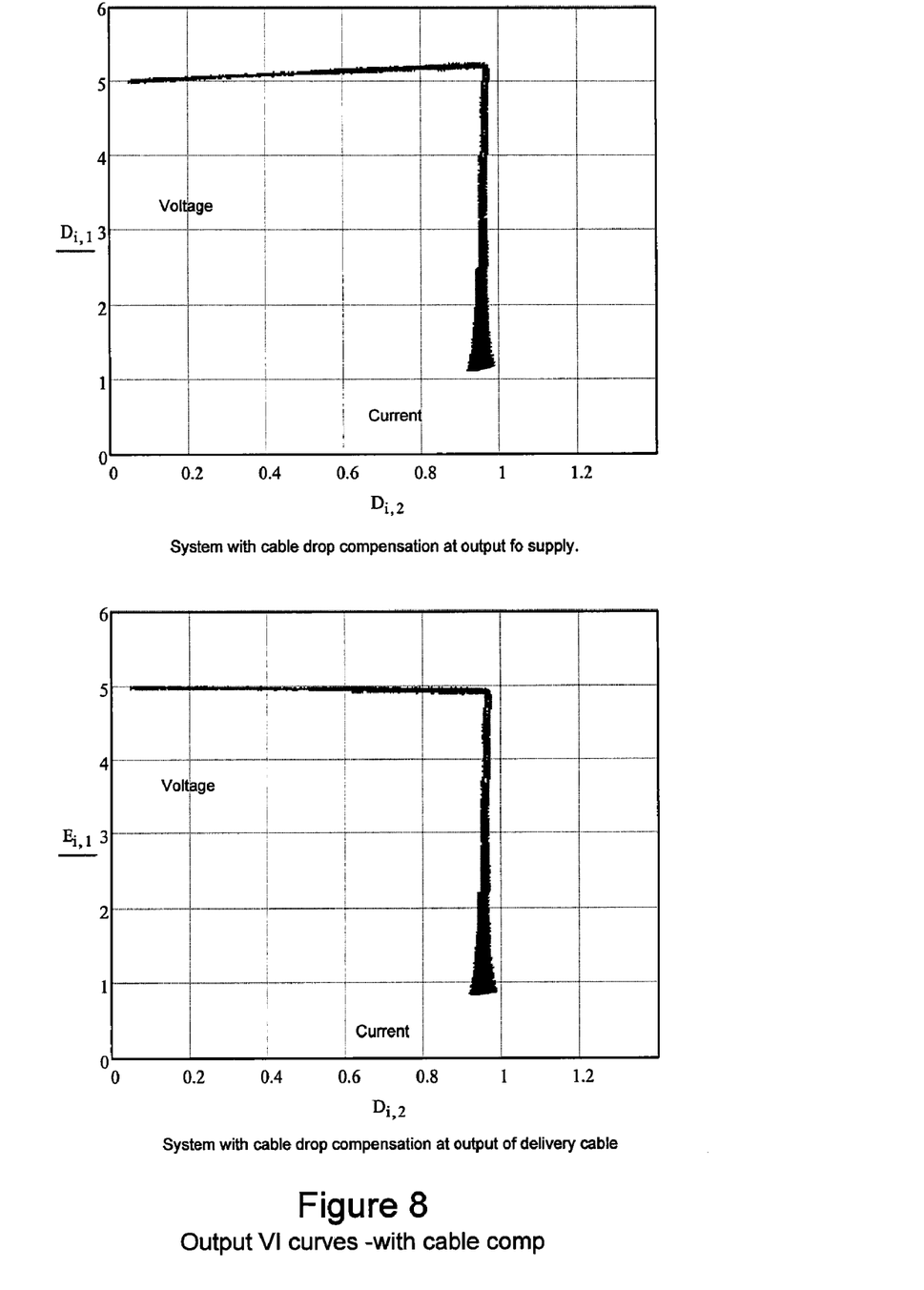
FIG. 8 is a plot of the VI performance curve showing the output voltage and current performance at the output of a power supply, and at the end of a 300 mili-ohm cable used as a delivery cable. This plot is of a system in accordance with one embodiment of the present invention.

The performance results of this technique are shown in FIG. 7 and FIG. 8. FIG. 7 is a VI curve that shows the power supply performance at the output of the supply on the top and at the output of the delivery cable on the bottom. One can see that the regulation at the output of the supply is good, since the voltage stays the same at the output as the load current is increased. However, the output at the end of the delivery cable drops as the load current is increased. This is an undesirable behavior.

FIG. 8 is the same VI performance curve for a system with the modification of the present invention included. The bottom curve of the two, which represents the output at the end of the delivery cable, is now flat with output current increase, which is the desired behavior. One can also observe that the output of the supply is increased automatically as the load current increases in order to accomplish the apparent regulation at the end of the cable as seen by the bottom curve.

Figure 6:
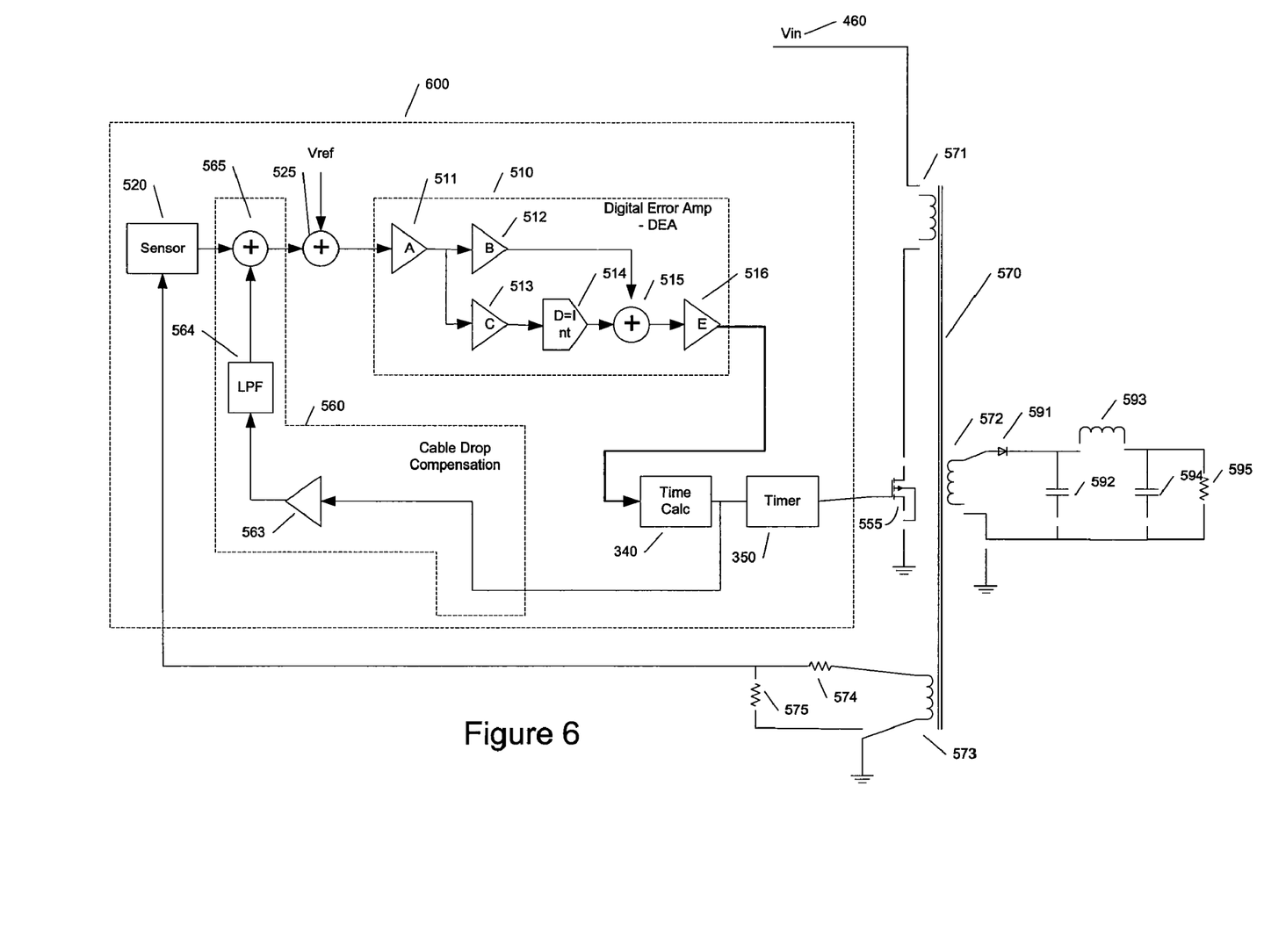
FIG. 6 is an illustration of another embodiment a primary side sensing feedback control system for voltage and current regulation that uses the Ton time instead of the control voltage (Vc) to approximate the average output current in accordance with one embodiment of the present invention.

FIG. 6 is an illustration of another embodiment 600 of the present invention and is similar to the embodiment of the present invention illustrated in FIG. 5 with the a difference being that the output Ton time is used instead of the control voltage Vc. It has the same slightly non-linear function since Ton is exactly linear with Vc. Since the proportional term is not already separated from the integral term, the low pass filter 664 is more responsible for removing high frequency noise from the feedback. The scale factors are different, but the operation is the same. Experimentation and simulation shows that there is signal to noise advantage to using the integral term ("I Term") of the control voltage (Vc).

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A switch-mode power supply control system for regulating an output voltage at the output of a delivery cable of a power supply over multiple switching cycles said power supply having a primary side and a secondary side that includes said delivery cable, the system comprising:
   a transformer having a primary magnetizing inductance that electrically separates said primary and secondary sides;
   a sense voltage unit having a winding on the primary side, to generate a sense voltage on the primary side that is proportional to an output voltage signal on the secondary side;
   a cable offset voltage unit positioned on the primary side, for determining an offset voltage signal representing a drop in voltage caused by load current passing through the delivery cable positioned on the secondary side; and
   a feedback unit, for generating a digital feedback voltage signal on the primary side that is used to maintain a substantially constant voltage at the output of the delivery cable over multiple switching cycles, said digital feedback voltage signal determined based upon at least said sense voltage signal, said offset voltage signal and a reference voltage signal representing a target voltage for the voltage regulation wherein
      the feedback unit generates a control voltage; and
      wherein the cable offset voltage unit determines the offset voltage signal, the cable offset voltage unit including:
         a current converter that receives the control voltage and converts the control voltage to an offset current signal using an offset process;
         an offset voltage generator that receives the offset current, for converting the offset current signal to the offset voltage signal using a scaling factor based on the value of the resistance of the output cable.

2. The system of claim 1, wherein said feedback unit includes:
   a compensation unit for generating a first compensation signal representing a combination of said reference voltage signal and said offset voltage signal; and
   an error amplifier, coupled to said compensation unit and said cable offset voltage unit, for generating an integrated compensation signal by integrating said first compensation signal over multiple switching cycles;
   wherein said cable offset voltage unit determines said offset voltage signal at a subsequent switching cycle based upon said integrated compensation signal.

3. The system of claim 2, wherein said cable offset voltage unit further comprises:
   an adjusted compensation signal unit for generating an adjusted compensation signal based upon said integrated compensation signal and a threshold signal; and
   a filter for filtering said adjusted compensation signal.

4. The system of claim 3, wherein said threshold signal represents a Y intercept of a linear equation that approximates output current as a function either loop filter control voltage (Vc) or on-time (Ton).

5. A method for regulating an output voltage at the output of a delivery cable of a power supply over multiple switching cycles said power supply having a primary side and a secondary side that includes said delivery cable wherein a transformer, having a primary magnetizing inductance that electrically separates said primary and secondary sides, the method comprising the steps of:
   generating a control voltage;
   generating a sense voltage signal on the primary side of said transformer, that is proportional to an output voltage signal on the secondary side;
   determining an offset voltage signal representing a drop in voltage caused by load current passing through the delivery cable positioned on the secondary side, wherein determining step is performed on the primary side wherein the step of determining the offset voltage signal comprises the steps of,
      converting the control voltage to an offset current signal using an offset process; and
      converting the offset current signal to the offset voltage signal using a scaling factor based on the value of the resistance of the output cable; and
   generating a digital feedback voltage signal on the primary side that is used to maintain a substantially constant voltage at the output of the delivery cable over multiple switching cycles, said digital feedback voltage signal determined based upon at least said sense voltage signal, said offset voltage signal and a reference voltage signal representing a target voltage for the voltage regulation.

6. The method of claim 5, wherein said step of generating a digital feedback signal further comprises the steps of:
   generating a first compensation signal representing a combination of said reference voltage signal and said offset voltage signal;
   generating an integrated compensation signal by integrating said first compensation signal over multiple switching cycles;
   using said integrated compensation signal to determine said offset voltage signal at a subsequent switching cycle.

7. The method of claim 6, wherein said step of determining an offset voltage signal further comprises the steps of:
   combining said integrated compensation signal and a threshold signal; and
   filtering said adjusted compensation signal.

8. The method of claim 7, wherein said threshold signal represents a Y intercept of a linear equation that approximates output current as a function of either loop filter control voltage (Vc) or on-time (Ton).

9. A system for regulating an output voltage at the output of a delivery cable of a power supply over multiple switching cycles said power supply having a primary side and a secondary side that includes said delivery cable wherein a transformer, having a primary magnetizing inductance that electrically separates said primary and secondary sides, the method comprising the steps of:
   sense voltage generating means for generating a sense voltage signal on the primary side of said transformer that is proportional to an output voltage signal on the secondary side;
   offset voltage means, positioned on the primary side, for determining an offset voltage signal representing a drop in voltage caused by load current passing through the delivery cable positioned on the secondary side, wherein determining step is performed on the primary side;
   feedback means, positioned on the primary side, for generating a digital feedback voltage signal on the primary side that is used to maintain a substantially constant voltage at the output of the delivery cable over multiple switching cycles, said digital feedback voltage signal determined based upon at least said sense voltage signal, said offset voltage signal and a reference voltage signal representing a target voltage for the voltage regulation wherein:

the feedback means generates a control voltage; and wherein the cable offset voltage unit determines the offset voltage signal, the cable offset voltage unit including:

a current converter that receives the control voltage and converts the control voltage to an offset current signal using an offset process; and an offset voltage generator that receives the offset current, for converting the offset current signal to the offset voltage signal using a scaling factor based on the value of the resistance of the output cable.

10. The system of claim 9, wherein said feedback means further comprises:

compensation means for generating a first compensation signal representing a combination of said reference voltage signal and said offset voltage signal;

integration means for generating an integrated compensation signal by integrating said first compensation signal over multiple switching cycles;

wherein using said integrated compensation signal to determine said offset voltage signal at a subsequent switching cycle.

11. The system of claim 10, wherein said offset voltage means comprises:

combining means for combining said integrated compensation signal and a threshold signal; and filtering means for filtering said adjusted compensation signal.

12. The system of claim 11, wherein said threshold signal represents a Y intercept of a linear equation that approximates output current as a function of either loop filter control voltage (Vc) or on-time (Ton).

13. The system of claim 9, wherein the resistance of the output cable is known.

14. The system of claim 1, wherein the resistance of the output cable is known.

15. The system of claim 5, wherein the resistance of the output cable is known.

* * * * *